United States Patent
Radhakrishnan et al.

(10) Patent No.: US 8,589,357 B2
(45) Date of Patent: Nov. 19, 2013

(54) TECHNIQUES FOR AUTOMATICALLY TRACKING AND ARCHIVING TRANSACTIONAL DATA CHANGES

(75) Inventors: Venkatesh Radhakrishnan, Cupertino, CA (US); Vasudha Krishnaswamy, Fremont, CA (US); Liang Guo, San Jose, CA (US); Bipul Sinha, Foster City, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 755 days.

(21) Appl. No.: 11/863,310

(22) Filed: Sep. 28, 2007

(65) Prior Publication Data

US 2008/0098045 A1    Apr. 24, 2008

Related U.S. Application Data

(60) Provisional application No. 60/862,225, filed on Oct. 20, 2006.

(51) Int. Cl.
*G06F 17/00* (2006.01)
*G06F 17/30* (2006.01)
*G06F 11/00* (2006.01)

(52) U.S. Cl.
CPC ............... *G06F 17/00* (2013.01); *G06F 17/30* (2013.01); *G06F 11/00* (2013.01)
USPC ........... 707/684; 707/638; 707/672; 707/703; 707/751; 707/754; 707/758; 714/19

(58) Field of Classification Search
USPC ............ 714/19; 707/638, 672, 684, 703, 746, 707/751, 754, 758, 826
See application file for complete search history.

(56) References Cited

U.S. PATENT DOCUMENTS 5,440,730 A * 8/1995 Elmasri et al. ............ 1/1
5,455,944 A * 10/1995 Haderle et al. ............ 1/1

(Continued)

FOREIGN PATENT DOCUMENTS

| EP | 1160682 | * | 12/2001 |
| WO | WO 03/044701 | * | 5/2003 |
| WO | WO 2008/006059 | * | 1/2008 |

OTHER PUBLICATIONS

Kjetil Nørv ag, "A Comparative Study of Log-Only and In-Place Update Based Temporal Object Database Systems",CIKM '2000 Washington, DC, USA, pp. 1-8.*

(Continued)

*Primary Examiner* — Srirama Channavajjala
(74) *Attorney, Agent, or Firm* — Vista IP Law Group, LLP

(57) ABSTRACT

A technique for making versions of rows of a user-defined tracked table temporally queryable. The database management system of the technique permits temporal queries of user-defined tables. The queries return versions of rows in the user-defined table that are currently in an undo log maintained by the database system. Associated with the tracked table are a system history table which contains versions of the rows and temporal metadata indicating when the versions were in the tracked table and a system form history table which contains versions of the form of the tracked table and metadata indicating when the tracked table had the form. These tables are created and maintained by a background process in the database management system. A temporal query on the tracked table combines results from the undo log with results from the system history table. The results' form is determined by the system form history table.

22 Claims, 7 Drawing Sheets

(56) References Cited

U.S. PATENT DOCUMENTS

| | | | | |
|---|---|---|---|---|
| 5,845,292 | A * | 12/1998 | Bohannon et al. | 1/1 |
| 6,185,699 | B1 * | 2/2001 | Haderle et al. | 714/19 |
| 6,442,543 | B1 * | 8/2002 | Snodgrass et al. | 1/1 |
| 6,477,546 | B1 * | 11/2002 | Velamuri et al. | 1/1 |
| 6,983,286 | B1 * | 1/2006 | Sinha et al. | 1/1 |
| 7,552,112 | B2 * | 6/2009 | Jhala et al. | 1/1 |
| 7,689,549 | B2 * | 3/2010 | Krishnamurthy et al. | 707/999.003 |
| 2002/0087271 | A1 * | 7/2002 | Rozenshtein et al. | 702/1 |
| 2003/0061537 | A1 * | 3/2003 | Cha et al. | 714/16 |
| 2004/0139116 | A1 * | 7/2004 | Porter | 707/104.1 |
| 2004/0225696 | A1 * | 11/2004 | Wong et al. | 707/203 |
| 2005/0050552 | A1 * | 3/2005 | Fuller | 719/321 |
| 2005/0055385 | A1 * | 3/2005 | Sinha et al. | 707/203 |
| 2005/0114409 | A1 * | 5/2005 | Sinha et al. | 707/203 |
| 2005/0125430 | A1 * | 6/2005 | Souder et al. | 707/100 |
| 2005/0131966 | A1 * | 6/2005 | Lou | 707/204 |
| 2005/0132375 | A1 * | 6/2005 | Douceur et al. | 718/100 |
| 2005/0193035 | A1 * | 9/2005 | Byrne | 707/202 |
| 2005/0216494 | A1 * | 9/2005 | Klein et al. | 707/100 |
| 2005/0240633 | A1 * | 10/2005 | Krishnaswamy et al. | 707/200 |
| 2006/0117074 | A1 * | 6/2006 | Ezzat | 707/202 |
| 2006/0161523 | A1 * | 7/2006 | Dettinger et al. | 707/3 |
| 2006/0161606 | A1 * | 7/2006 | Biswal et al. | 707/204 |
| 2006/0184563 | A1 * | 8/2006 | Potter | 707/102 |
| 2006/0212492 | A1 * | 9/2006 | Jacobs et al. | 707/202 |
| 2007/0067357 | A1 * | 3/2007 | Clark | 707/203 |
| 2007/0130171 | A1 * | 6/2007 | Hanckel et al. | 707/100 |
| 2007/0162441 | A1 * | 7/2007 | Idicula et al. | 707/5 |

OTHER PUBLICATIONS

Tal Kelley, "Using Triggers to Track Database Action History-Printer Friendly Version", http://www.developerfusion.com/show/2413/.

Oracle Flashback Technology, Oracle Flashback Technology Reduces Recovery Time from Hours to Minutes, 2005, 6 Pages, http://www.oracle.com/technetwork/database/features/availability/index.html.

* cited by examiner

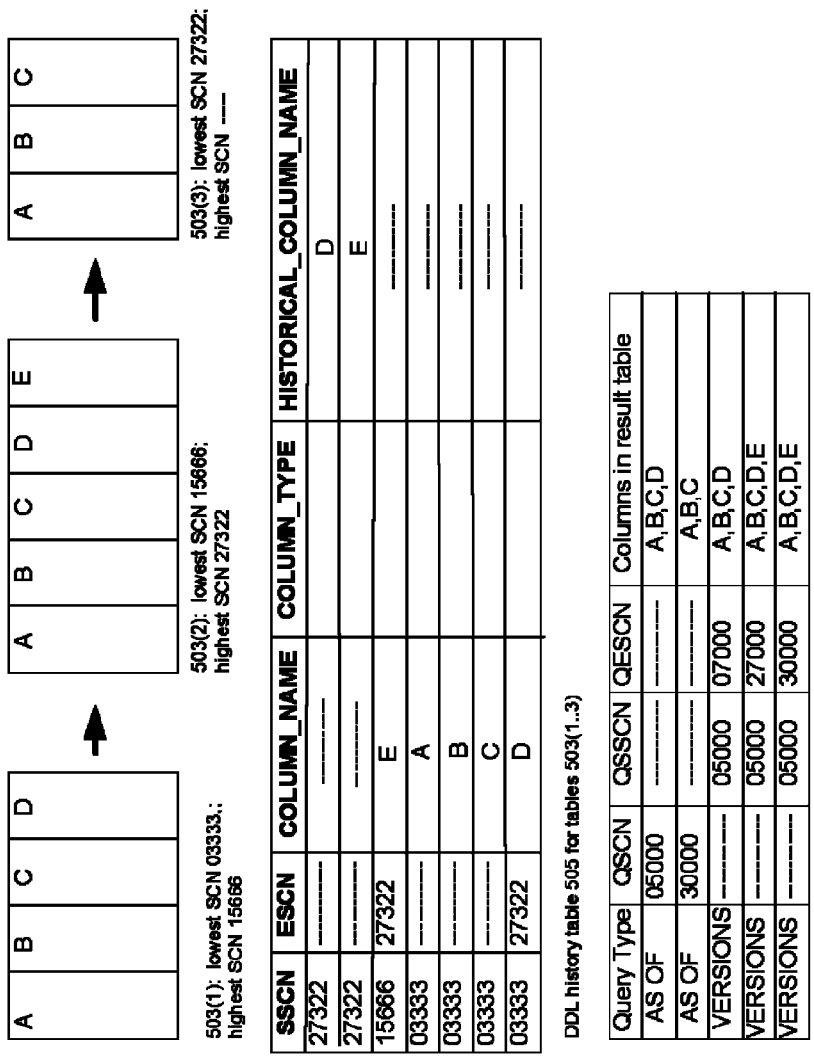

Global barrier SCN = 343520

Select * from GREATMOUNTAINEERS as of SCN 335672 where ID = 1

Is rewritten in the semantic analyzer/optimizer phase of query generation as:

Select * from (select ID, NAME, AGE from ((select ID, NAME, AGE from SCOTT.SYS_FBA_HIST_53127 where ((STARTSCN <= 335672 or startscn is NULL) and ENDSCN > 335672 and ENDSCN <= 343520))

union all (select t.ID "ID", t.NAME "NAME", t.AGE "AGE" from SCOTT.GREATMOUNTAINEERS versions between SCN 343520 and MAXVALUE t, (select RID, STARTSCN, ENDSCN, XID, OP from SCOTT.SYS_FBA_TCRV_53127 where (ENDSCN > 343520 or ENDSCN is NULL) and (STARTSCN < 343520 or STARTSCN is NULL)) f where ((t.versions_STARTSCN is NULL) and (t.ROWID = f.RID(+)) and ((f.STARTSCN <= 335672) or (f.STARTSCN is NULL))))) where ID=1

Fig. 6

TECHNIQUES FOR AUTOMATICALLY TRACKING AND ARCHIVING TRANSACTIONAL DATA CHANGES

CROSS-REFERENCE TO RELATED APPLICATIONS

This patent application claims priority from U.S. provisional patent application 60/862,225, Krishnaswamy, et al., Techniques for automatically tracking and archiving transactional data changes, filed Oct. 20, 2006. That application is incorporated by reference into the present patent application. A patent application having subject matter closely related to the present patent application is U.S. Ser. No. 11/291,446, Banerjee, et al., Database system that provides for history-enabled tables, which is assigned to the same assignee as the present patent application. U.S. Ser. No. 11/291,446 was filed Dec. 1, 2005 and published as U.S. published patent application 2007/0130226 on Jun. 7, 2007.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The invention concerns techniques for making user tables in a database system into tracked tables on which temporal queries involving versions of rows in the tracked tables may be performed.

2. Description of Related Art

Techniques for Dealing with Time in Database Tables

There are of course many situations in which a user will include time information in a database table. A systematic discussion of the ways in which this may be done and of the difficulties that SQL, the standard language used to write queries in relational database systems, has in expressing queries involving time information may be found in Richard T. Snodgrass, *Developing Time-oriented Database Applications in SQL*, Morgan-Kaufmann Publishers, San Francisco, USA, 2000. Useful terminology from the Snodgrass book includes the following:

There are three fundamental temporal datatypes:
Instant: something happened at an instant of time (e.g., now, Jul. 18, 2005, when this is being written, or sometime, perhaps much later, when it is being read)
Interval: a length of time (e.g., three months)
Period: an anchored duration of time (e.g., the fall semester, Aug. 24 through Dec. 18, 1998)
There are three fundamental kinds of time.
User-defined time: an uninterpreted time value
Valid time: when a fact was true in the reality being modeled in the table
Transaction time: when a fact was stored in the database
These kinds of time are orthogonal: a table can be associated with none, one, two, or even all three kinds of time. The tables that are of interest for the following discussion are those associated with transaction time, which Snodgrass terms transaction-time state tables. Transaction-time state tables have the property that they can be reconstructed as of a previous date. Transaction-time state tables permit queries involving specific points in time and periods of time. Such queries are termed in the following temporal queries. Examples are:

a query to determine what versions of the table's rows were in the table as of a given date; such a query will be termed in the following an As Of query; and
a query to determine what versions of the table's rows were in the table during a given period of time; such a query will be termed in the following a versions query. In the versions query, the period of time may be specified by BETWEEN A AND B, where A and B are values that represent points in time.

A temporal query requires temporal metadata from which the temporal query can determine the period during which a version of a row was present in the table. Various kinds of temporal metadata are of course possible; one of the simplest kinds of temporal metadata is a start value indicating when the version was added to the table and an end value indicating when the version ceased being present in the table.

Using Undo Logs for Temporal Queries

An undo log was originally a log maintained in a relational database system for the purpose of rolling back a transaction. When an operation was performed on a row during a transaction, the condition of the row prior to the modification was recorded in an entry in an undo log. The undo log entry also included temporal metadata indicating the period during which the row had been in the prior condition. If the transaction failed, the undo log entries could be used to undo the operations that had been performed up to the transaction's failure. Over time, many other uses have been found for the information in the undo log. One of the earliest was to ensure what are termed consistent reads, namely, to ensure that a field value in a record which was read during a transaction and read again during the same transaction did not change as a result of a write by another party to the field: on further reads of the field during the transaction, the field's value was read by applying undo to the current copy of the record to get the value of the field as of the start of the transaction.

A feature of Oracle@ database systems termed Flashback query took advantage of the temporal metadata contained in the undo log entry to perform temporal queries which returned versions of rows contained in the undo log. The temporal queries (either AS OF or version) were specified by means of a flashback clause in the SQL SELECT statement. A flashback query on a table worked by using the information in the undo log about versions of rows of the table to reconstruct the version of the row. For each version of the row, the version was reconstructed by applying the information in the undo log to the current version of the table. The temporal query was then applied to the set of reconstructed versions.

There were several problems with Flashback query:
There was only a limited amount of space available in the database system for the storage of the undo log; consequently, the undo log was implemented as a circular log; when the space allocated to the undo log became full of undo data, the database system overwrote the oldest undo data in the undo log with new undo data. As a consequence, temporal queries would not work where the desired versions were no longer present in the undo log.
Flashback queries could not be performed across changes in the form of a table, for example if columns were added or dropped.
Reconstruction of row versions from the undo data was slow compared with a query on a table; further, the more undo that needed to be applied, the longer the reconstruction took.

In the following discussion, Flashback query as just described will be termed limited Flashback.

History-Enabled Tables

A known way of dealing with some of the foregoing limitations of limited Flashback is by creating history-enabled tables. When a table in a database system is history-enabled, it is associated with a history table in which the history of the rows of the history-enabled table is recorded. Each row of the history table specifies a state of a row of the history-enabled table and the period of time during which the row was in that state in the history-enabled table. The history table is modified each time a row is added, changed, or deleted in the history enabled table. Temporal queries can be done on the history table.

An embodiment of a history-enabled table is disclosed in a paper by Tal Kelley, *Using Triggers to track database action history* from the year 2001, which was found in Jul. 2005 at www.developerfusion.com/scripts/print.aspx?id=2413. The paper describes a technique for associating a history database table with a history-enabled database, table. A row is inserted in the history table whenever a row is inserted into the history-enabled table or an existing row in the history-enabled table is updated. The history table has columns that are equivalent to those in the history-enabled table and has additional columns that indicate the time at which the row in the history-enabled table was inserted or updated and the operation in the history-enabled table that resulted in the row being inserted in the history table. When a row is inserted in the history-enabled table, the row inserted into the history table includes the data from the history-enabled table row, the time the row was inserted in the history-enabled table, and indicates that the operation was "insert". When a row is updated in the history-enabled table, the row that is inserted in the history table has the data from the history-enabled table row as updated, the time the row was updated in the history-enabled table, and indicates that the operation was "update".

The rows are inserted into the history table by triggers, that is, user-written code that is automatically executed by the database system when certain events occur with regard to a table. Two of the events which may result in the execution of a trigger are the insertion of a row and the update of a row; thus, an insertion of a row in the history-enabled table results in an execution of an insert trigger that creates the row corresponding to the insertion operation in the history table; similarly, the update of a row results in an execution of an update trigger that creates the row corresponding to the update operation in the history table. The history table thus has a row for every version of every record that ever was or currently is in the history table. Consequently, not only AS OF queries, but also version queries may be made on the history table.

As may be seen from the foregoing, because rows are added to the history table as the history enabled table is modified, the queries that return past values of data are not limited to past values that are contained in the undo data. Further, because the history table need not be reconstructed but is always available in the same fashion as any other table in the database, a query on the history table takes no longer than other queries. While queries on history tables are not temporally limited by the amount of undo data as Flashback operations are, they have serious disadvantages of their own:

Because the triggers that record changes to the history-enabled table in the history table are executed each time the data in the history-enabled table changes, they affect the performance of all queries which modify the history enabled table; moreover, each execution of a trigger is the result of a single change in the history-enabled table; the operations on the history table consequently cannot be batched.

The trigger code is associated with the history-enabled table; making the table history enabled thus requires a change to the table. In many cases, making the table history enabled also involved adding data fields to the history-enabled table for the metadata required for the temporal queries on the history table.

Trigger code must be provided for each history-enabled table.

The history-enabled table cannot change its form during the period in which the history-enabled table is associated with its history table.

What is needed is thus a way of saving the history of database objects and doing temporal queries and other Flashback operations on them which has the ease of use of Flashback queries, permits temporal queries directly on the history-enabled table, interferes minimally with execution of queries by the database system, does not require any alteration of the table whose history is being tracked, permits saving history for an unlimited period of time, can deal with changes in the form of the database table whose history is being tracked, and permits temporal queries that are substantially as fast as queries on any other table in the database. It is an object of the present invention to provide such a technique.

BRIEF SUMMARY OF THE INVENTION

The invention attains its object by a method of saving a set of historical versions of an object belonging to a set of tracked objects such that a temporal query can be made on the set of tracked objects. The temporal query takes into account both the versions in the set of tracked objects and the versions in the set of historical versions. The method includes the following steps:

when a version in the tracked set is replaced by another version, including temporal metadata for the other version in a set of current temporal metadata associated with the tracked set of objects and altering the temporal metadata for the replaced version in the set of temporal metadata as required by the replacement; and placing the replaced version and the temporal metadata for the replaced version in the set of historical versions.

With the tables of the foregoing method in place in a database management system which permits temporal queries of versions of a table that are contained in an undo log which includes temporal metadata for the objects, temporal queries are performed on the tracked set of objects as follows:

performing a temporal query on the set of undo objects corresponding to the tracked objects using the temporal metadata associated with the undo objects;

using the historical temporal metadata to perform a temporal query on the set of historical versions; and combining the results of the temporal query on the set of undo objects with the results of the temporal query on the set of historical versions.

In another aspect, the techniques include an archive for versions of objects belonging to a tracked set of objects, the archive including:

a set of history objects for versions of objects in the tracked set of objects, the history objects including temporal metadata required for a temporal query on the set of history objects; and a set of form history objects for the tracked set of objects which describe versions of the form of the tracked set of objects and to temporal metadata indicating when the versions existed, the database management system employing the set of form history objects to determine a form of query results returned from the set of history objects.

In a further aspect, the techniques employ a system set of temporal metadata which is associated with a set of tracked objects and renders the tracked objects temporally queryable. The system set of temporal metadata includes a member of the set of system temporal metadata corresponding to each object of the set of tracked objects; and in a given member of the set of system temporal metadata, temporal data from which it may be determined when the corresponding object of the set of tracked objects was last modified.

An additional aspect of the technique is a method performed in a relational database management system which maintains records of prior versions of altered objects of automatically maintaining a set of former versions of a tracked object, the method including the steps of:

determining from the maintained records whether the tracked object has been modified; and responding when the maintained records so indicate by adding the former version of the tracked object to a set of versions of the tracked object, each version of the tracked object in the set of versions being associated with temporal metadata from the record of the prior version indicating the period during which the former version was the current version.

A still further aspect of the technique is using a spatial index for temporal queries. An index for versions of objects belonging to a set of tracked objects includes for each version temporal metadata indicating a period during which the version had belonged to the set of tracked objects, the index including for each version of an object:

an identifier for the version and the version's temporal metadata, whereby the objects are modeled as line segments and temporal queries are solved using the index as intersection problems.

Other objects and advantages will be apparent to those skilled in the arts to which the invention pertains upon perusal of the following Detailed Description and drawing, wherein:

BRIEF DESCRIPTION OF THE SEVERAL VIEWS OF THE DRAWINGS

FIG. 5 is a diagram of how the DDL history table captures changes of form in the tracked table and how the information in the table is used in temporal queries;

FIG. 6 is an example temporal query made using the Flashback archive; and

Figure 1:
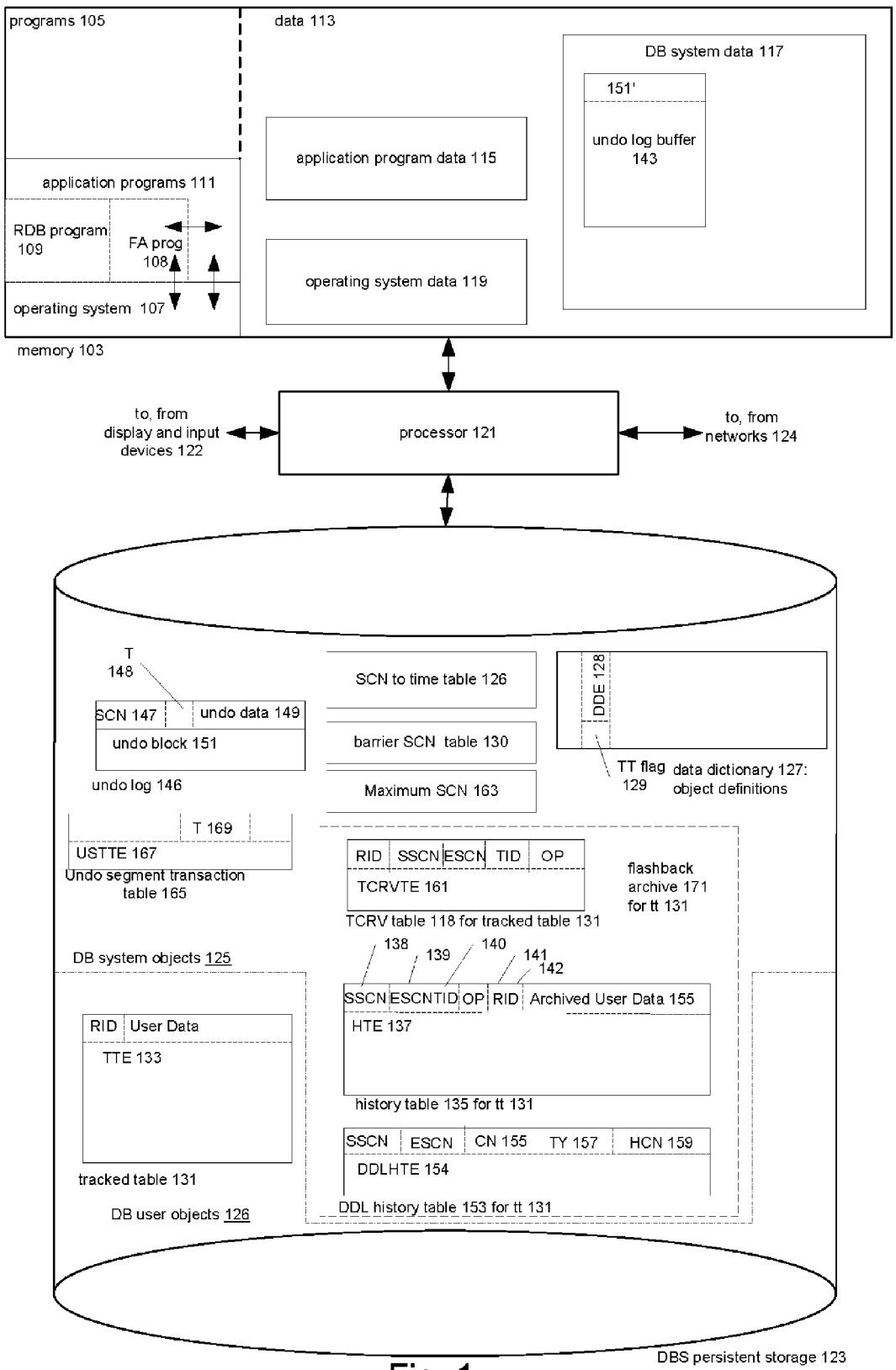
FIG. 1 provides an overview of a preferred embodiment of the techniques for automatically tracking and archiving transactional changes.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

Overview of the Invention

Overview of a Relational Database System in which the Invention is Implemented: FIG. 1

In the following, a preferred embodiment of an archiving system which solves the foregoing problems will be termed unlimited Flashback. The preferred embodiment described in the following has been implemented by modifying the Oracle 11gR1 relational database system manufactured by Oracle Corporation, Redwood City, Calif. The invention may of course be embodied in other relational database systems as well. FIG. 1 provides a high-level overview of an Oracle 11gR1 database system 101 as modified for the preferred embodiment. The main components of system 101 are a processor 121, a memory 103 which contains programs 105 being executed by the processor and data 113 involved in the program executions, and persistent storage 123 for the database system's tables and other objects. Processor 121 may further receive inputs from input devices such as a keyboard and/or pointing device and produce outputs to a display device such as a CRT, as shown at 122, and may also receive inputs from and provide outputs to one or more networks, containing other processors, as shown at 124.

When system 101 is operating, programs 105 in memory 103 include an operating system 107, a relational database system program 109, and application programs 111 that employ the services provided both by operating system 107 and database program 109. Correspondingly, data 113 in memory 103 includes data for the application programs, data for the operating system, and data for the database system. Operation typically involves an application program 111, which provides a query to relational database program 109. Database program 109 executes the query on the tables in persistent storage 123 and provides the result to application program 111. Database program 109 includes Flashback archive program 108. Both RDB program 109 and application program 111 use the services provided by operating system 107, and execution of the application program or the database RDB program may involve inputs from and outputs to I/O devices and the network.

Continuing in more detail, persistent storage 123 contains two classes of objects: DB system objects 125, which are objects, including tables, that are defined by database system 101 and are used by database system 101 to manage and operate the database system, and user objects 129, which contain tables and other objects defined by users of the database system. Data dictionary 127 contains definitions of all of the objects in the database system.

The most important objects in database system 101 are tables. A table is a queryable set of rows. All of the rows in the set have the same columns. The columns in a table define the objects that the rows in the table may contain. There are three kinds of tables in most database systems: base tables, views, and materialized views. Base tab/es are the tables that are the actual sources of the data in the table rows returned by a query. Views are tables which do not exist in their own rights in persistent storage 123, but are instead created using data from other tables. A view is defined in the data dictionary by a query on other tables. The other tables may also be views, but the data must ultimately come from base tables. A materialized view is a view of which, for reasons of efficiency, a copy has been made in persistent memory. Data dictionary 127 contains definitions of base tables, of tables defined in terms of the base tables, and definitions of other objects that are defined for the tables. These other objects include indexes, which speed up access to the data contained in a column of a table, triggers, which define actions to be taken upon occurrence of events concerning the table, and functions, which are programs that operate on database system objects. In a preferred embodiment of database system 101, the functions are written in the well-known PL/SQL language.

Two entities in Oracle relational database systems which are particularly important to the following discussion are row identifiers and system change numbers.

Each row in a table in a given instance of an Oracle database system has a globally unique row identifier (RID) associated with it; the row identifier is created at the time the row is inserted into a table and destroyed when the row is removed from a table.

A system change number (SCN) is a stamp that defines a committed version of a database at a point in time. Oracle assigns every committed transaction a unique SCN. SCNs in a given instance of an Oracle relational database system are monotonically increasing.

Overview of Unlimited Flashback as Implemented in System 101

With unlimited Flashback, a user table in system 101 may be designated as a tracked table, i.e., a table for which changes in the values in the table's records and changes in the form of the table are tracked by the database system. One such tracked table, tracked table 131, is shown in FIG. 101. In the following discussion, a particular user table that is a tracked table 131 may be designated as tracked table 131(i), where (i) may also be another letter. Like any base table in an Oracle database system, each row TTE 133 in tracked table 133 has in addition to user-defined columns (user data)a pseudo column for the TTE 133's RID. When a table is designated a tracked table, a Tracked Table (TT) flag 129 is set in the table's data dictionary entry 128 in data dictionary 127.

A tracked table 131 has a Flashback archive 171 associated with it in the persistent, storage 123 of the relational database system. The flashback archive 171 associated with a particular tracked table 131(i) may be designated as flashback archive 171(i). Flashback archive 171 contains three tables: history table 135 for the tracked table, DDL history table 153 for the tracked table, and TCRV table 118 for the tracked table. When these tables are associated with a flashback archive 171(i), they will have the reference numbers 135(i), 153(i), and 118(i). History table 135 tracks the contents of rows; it contains versions of all rows that have been in the tracked table while it was being tracked other than the current versions of the rows; DDL history table 153 tracks the forms of the table; it contains versions of all of the forms the table has had while being tracked. TCRV table 118 contains metadata needed to include the current rows of the tracked table in temporal queries and to make a history table row from a current row of the tracked table.

History Table 135

The rows of history table 135 contain past versions of the rows in tracked table 131. From the time at which a tracked table is designated as such, each modification or deletion of a row in the tracked table results in the creation of an entry (HTE 137) in the tracked table's history table 135 which archives the user data from the row as it existed prior to the modification. HTE 137 includes a archived user data 155 of the user data from the version of the row as it existed prior to the modification.

In addition, HTE 137 includes temporal metadata consisting of a start SCN and an end SCN: the start SCN (SSCN) 138 is the SCN of the transaction that produced the archived user data 155. The end SCN (ESCN 139) is the SCN belonging to the transaction on TT 131 that resulted in the creation of the HTE 137. The SSCN and the ESCN together thus define a period of time during which the version of the tracked table's row recorded in HTE 137 existed in the tracked table. Further fields of interest in HTE 137 are TID 140, which is the transaction identifier for the transaction on TT 131 which resulted in the tracked table's row being recorded in HTE 137, OP 141, which is the operation which the transaction performed in making the modification in TT 131 which resulted in the creation of HTE 137, and RID 142, which is the row ID of the archived row when the row was in TT 131. As will be immediately apparent, the inclusion of the SSCN and the ESCN make temporal queries of history table 135 possible, while the inclusion of the TID, OP, and RID fields in the temporal metadata make it possible to retrieve rows by RID or as they existed prior to the performance of a particular transaction or as they existed prior to a particular operation. It should further be pointed out that because history table 135 is not part of the undo log, it is not subject to being overwritten and can record versions of rows of the tracked table as long as is desired. In a preferred embodiment, HT 135 is visible to users of system 101 which have access to tracked table 131 and can be queried separately from tracked table 131.

TCRV Table 118

TCRV Table 118 provides solutions to two problems:

The SSCN, ESCN, RID, TID, and OP temporal metadata needed to make a row in history table 135 is not available in the row of the tracked table at the time the row in history table that contains that rows archived user data 155 is made; and the entries 133 in tracked table 131 do not contain the temporal metadata necessary for temporal queries on tracked table 131. Because history table 135 does not contain user data 155 from any row that is currently in tracked table 133, temporal queries must be made not only on the history table, but also on the tracked table; in general, the temporal query on the tracked table can be done as a limited Flashback query; in the rare case that there is no entry in the undo log for the a row, the row's temporal metadata will be in TCRV table 118.

TCRV table 118 contains the RID, SSCN, ESCN, TID, and OP temporal metadata for every current row of tracked table 131 which has been added or modified since tracked table 131 began to be tracked. TCRVT entry (TRVTE) 161 sets RID from the added or modified row's RID, SSCN from the SCN for the committed transaction that modified the row, TID from the transaction's transaction ID, and OP from the operation the transaction performed on the row. When a temporal query is performed on the tracked table, the temporal metadata that has been saved in TCRVTE 161 ensures that all of the temporal metadata is available which the foreground process requires to perform the temporal, query on the versions in the tracked table as well as to create the versions in history table 135. For example, if the temporal query is an AS OF query looking for rows which were in the tracked table as of a particular SCN, the metadata in TCRV table 118 will include the metadata for current rows in the tracked table. When the row in TTE 133 is deleted or modified, the temporal metadata for the deleted or modified row in TCRV table 118 is used to make the temporal metadata for the entry for the deleted, or modified row in history table 135. An important advantage of TCRV table 118 is that no temporal metadata need be added to tracked table 131 in order to include both tracked table 131 and tracked table 131's history table 135 in a temporal query on tracked table 131. It should be pointed out here that tables like TCRV table 118 could be employed to maintain all of the temporal metadata for the history enabled table in implementations in which temporal queries of the history enabled table that obtained row versions from the undo log were not available.

DDL History Table 153

DDL is the portion of the SQL query language for relational database systems which is used to define new tables and modify the definitions of existing tables. In the following, changes to tables resulting from the execution of DDL statements will be termed changes to the form of the table. An example is using DDL statements to add a column to a table or drop an existing column. As would be expected from the foregoing, DDL history table 153 has an entry, DDLHTE 154 corresponding to every form which tracked table 131 has had since the table was designated a tracked table. Each DDLHTE 154 includes temporal metadata consisting of an SSCN field which indicates when the change in form represented by the entry took place and an ESCN field which indicates when the next change in the form of tracked table 131 took place. The other fields of the entry are the name of a column which was added by the change in CN 155, the type of data in the column in TY 157, and the name of a column which was deleted by the change in HCN 159. Each addition or deletion of a column in tracked table 131 has its own entry in DDLHT 153. With the information contained in DDL history table 153 it is possible to make temporal queries of tracked table 131 across executions of DDL statements, i.e., across changes in the tracked table's form. It should be noted here that a DDL history table could be used in the manner just described with any history tables, including ones made using triggers, as described above with reference to the Kelley paper. Indeed, triggers could be used to make the entries in the DDL history table.

Conceptual Overview of Operation of Unlimited Flashback

At the highest conceptual level, the operation of unlimited Flashback is simple: A table's tracked table flag 129 in the table's DDE 128 may be set when the table is created or at any time thereafter, and once set, may be reset at any time thereafter. As long as flag 129 is set, the table is a tracked table 131 and each execution of a DDL statement which results in a modification of the tracked table's form causes a record of the modification to be written to DDLHTE 154 in the tracked table's DDL history table 153. Further, each operation performed by a transaction which modifies the data contained in a row of tracked table 131 or which causes the row to be deleted results in the creation of a HTE 137 in history table 135 corresponding to tracked table 131 which contains the row as it existed prior to the modification or deletion. The temporal metadata in the entries in history table 135, DDL history table 153, and TCRV table 118 and the temporal queries on row versions of tracked table 131 in the undo log that are permitted by limited flashback together make it possible to perform temporal queries across the current period during which the tracked table is tracked and across all of the modifications of the tracked table which occur in the current period during which the table is tracked. An important advantage of unlimited Flashback is that the version query of the undo data need only concern itself with those versions of the tracked table rows which are not already in the history table. That will generally be a much smaller set of versions than the complete set of versions in the undo data, with consequent savings in the time required for the version query of the undo data.

While a currently preferred embodiment of relational database management system 101 only permits tracking of versions of rows of the tracked table, the same techniques can be used to track versions of objects contained in the rows. In particular, partial history tracking can provide for the following:

1. Vertical Partial history provides tracking for a subset of columns of the table.
2. Horizontal Partial history provides tracking for a subset of rows (for ex: range of key values) of the table.
3. Rule based Partial history provides tracking for a subset of rows/columns based on rows that satisfy a given arbitrary expression.

Details of the Implementation of Unlimited Flashback

Unlimited Flashback need not use triggers to write the tables in Flashback archive 171 because the source of the information written to these tables is DBMS 101's undo log In DBMS 101, the undo log is written by a foreground process. In a DBMS in which unlimited Flashback has been enabled, when the foreground process writes the prior state of a row of a tracked table to the undo log, the foreground process marks the prior state as belonging to a tracked table. A Flashback archiver process which is separate from the foreground process and runs asynchronously to the foreground process then reads the marked portions of the undo log and writes rows in history table 135, in TCRV table 118, and in DDL history table 153 from the undo data as required by the modifications to the tracked table.

Returning to FIG. 101, the undo log of the preferred embodiment is shown at 146. As in limited Flashback, undo log 146 is circular. Undo log 146 contains undo blocks 151. Each undo block includes the following:

the TID identifying the transaction which performed the operation that resulted in the modification of the database;

the SCN of the modifying transaction;

the SCN of the transaction that made the row prior the modification;

the RID for the row prior to the modification;

the OP identifying the operation that made the modification; and and undo data 149, which is the contents of the affected row(s) prior to the modification.

One, of the SCNs is shown at 147. The two SCNs are of course the temporal metadata for the row in the undo block. If any of the affected row(s) belong to a tracked table, the undo block's tracked (T) flag 148 is set. In a preferred embodiment, undo log 146 is maintained in DBS persistent storage 123; however, memory 103 includes undo log buffer 143 which contains the most recently written undo: blocks 151. Because reading from memory 103 is faster than reading from DBS persistent storage 123, the frequency with which the Flashback archiver runs is selected such that the Flashback archiver is able to read the undo blocks 151 from undo log buffer 143 before they are written to undo log 146.

As part of its undo logging mechanism, the foreground process in limited Flashback maintains an undo segment transaction table which contains an entry for'each transaction that has a block in undo log 146. This table is shown at 165. In unlimited Flashback, the table's entries 167 include a T flag 169 which the foreground process sets when the entry's transaction has modified a tracked table. The entry for the transaction permits location of the data for the transaction in the undo log. Other components of system 101 which are of interest in the present context are SCN to time table 126, BSCN table 130, and maximum SCN 163. SCN to time table 126 is a system table that relates SCNs to time values. The table makes it possible to express a temporal query in terms either of SCNs or time values.

A barrier SCN (BSCN) is the minimum SCN such that every ESCN in the HTEs written by a given instance of the Flashback archiver is less than or equal to the barrier SCN. In a clustered version of the Oracle 11gR1 database system, there may be several instances of the Flashback archiver. Barrier SCN table 130 contains the current BSCN for each of the instances of the Flashback archiver. When the foreground process performs a temporal query, it uses the Global barrier SCN (GBSCN), which is the current smallest BSCN in table 130. The GBSCN is the largest SCN such that all HTEs resulting from transactions with commit SCNs less than GBSCN have already been written to an HT 135. The GBSCN thus marks the point in time which separates ESCNs for tracked table rows archived in the history table from possible ESCNs for the rows currently contained in the tracked table. The foreground process uses the GBSCN in temporal queries on the tracked table to determine which part, if any, of the query is to be performed on history table 135 and which on tracked table 131. Maximum SCN 163 is finally, is an SCN maintained by DBMS 101; it is the highest SCN assigned to any committed transaction thus far by DBMS 101.

Figure 2:
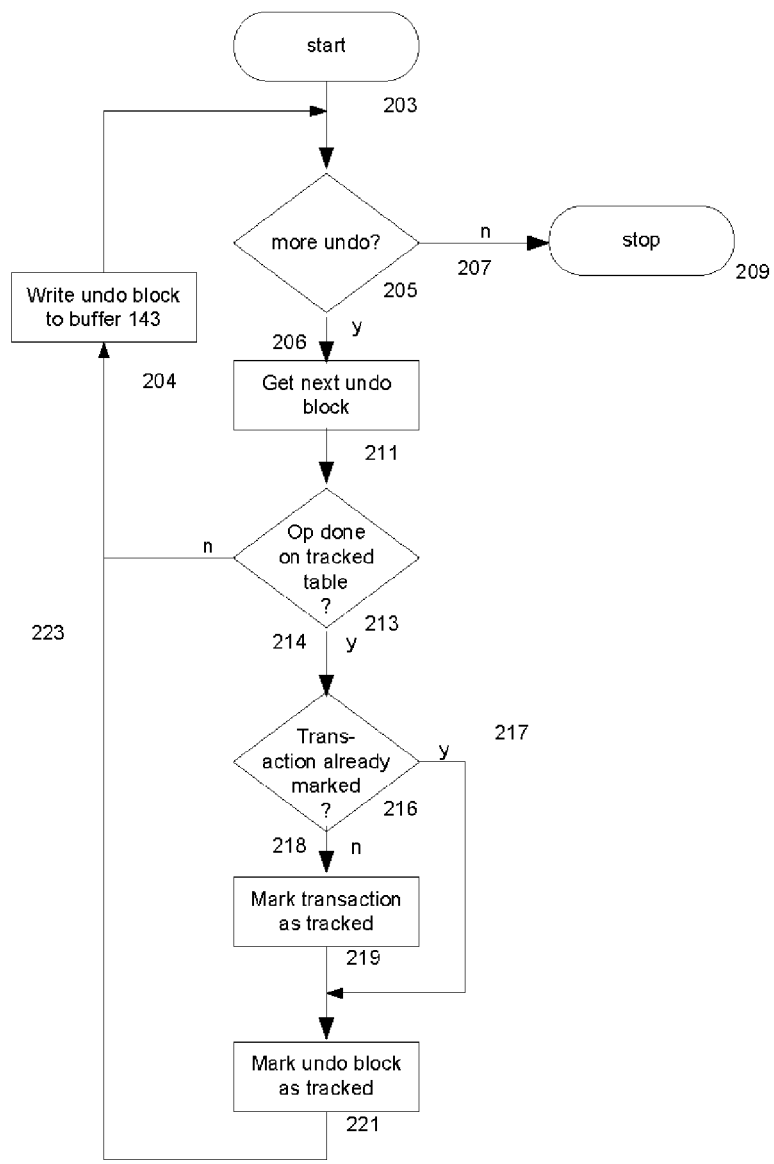
FIG. 2 is a flowchart of actions performed as the undo log is generated.

Marking Undo Blocks 151 for Tracked Tables 131: FIG. 2

The modifications made in the behavior of the foreground process in a preferred embodiment of unlimited Flashback are shown in simplified form in flowchart 201 in FIG. 2. As shown by start 203, loop 223, decision block 205, branch 207, and stop 209, the foreground process executes loop 223 as long as there is undo to be written to undo log 146. On each execution of loop 223, an undo block 151 is written to undo log buffer 143 (block 204). As modified for unlimited Flashback, for each undo block 151 to be processed, the foreground process determines at decision block 213 whether the operation specified in the undo block was done on a tracked table; if it was not, loop 223 is taken; if the operation was done on a tracked table, branch 214 is taken and the foreground process determines at 216 whether the transaction which performed the operation already has a flag T 169 set in its entry 167 entry in undo segment transaction table 165; if not, branch 218 is taken and the foreground process sets T flag 169 in the transaction's entry 167 to indicate that the transaction is operating on a tracked table (219). Otherwise, branch 217 is taken. Next, the undo block 151 is marked to indicate that the block contains the prior state of a row in a tracked table (221). Then loop 223 is repeated.

Figure 3:
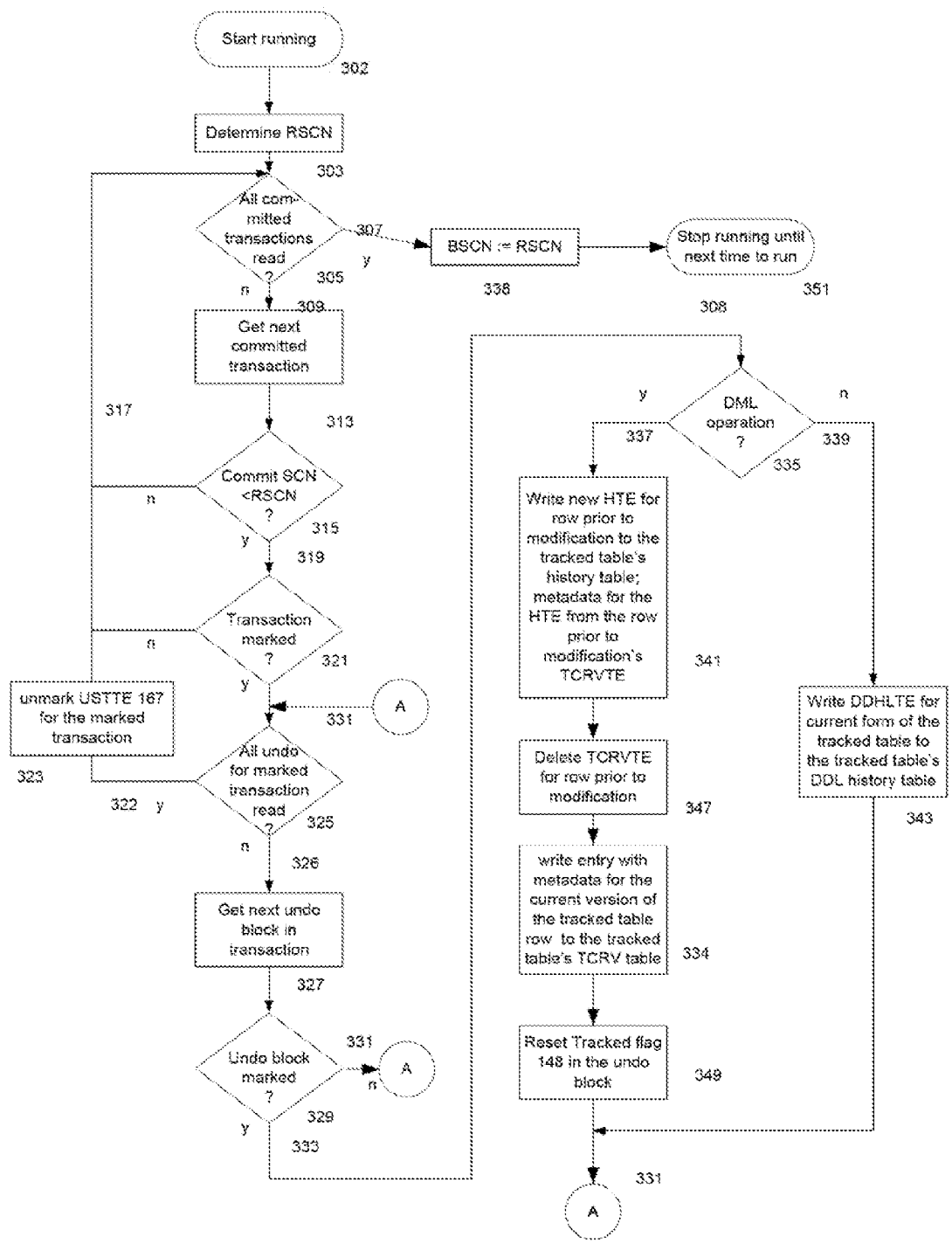
FIG. 3 is a flowchart of the actions performed by the Flashback archiver process.

Making Entries in History Table 153, Tcrv Table 118, and Ddl History Table 153: FIG. 3

FIG. 3 is a simplified flowchart 301 of how the Flashback archiver writes history table entries 137 in history tables 135, TCRVTE's 161 in TCRV tables 118, and DDHLTE's 154 in DDL history tables 153 in Flashback archives 171 belonging to tracked tables. As already mentioned, the Flashback archiver runs asynchronously to the foreground process. The intervals at which the Flashback archiver runs are determined in the preferred embodiment such that the archiver processes undo blocks 151 while they are still in undo log buffer 143. The flowchart begins at start 302; the first step is to determine the RSCN (303), which is the maximum SCN for which the Flashback archiver will make HTTEs 137, TCRVTEs 161, and DDLHTEs 154 on the current run. Then the Flashback archiver executes loop 317 until it has made HTTEs 137, TCRVTEs 161, and DDLHTEs 153 as required for all of the rows of the tracked tables which have been modified by transactions whose SCNs are less than RSCN since the Flashback archiver was last run (blocks 305, 338, 351). The Flashback archiver reads the next committed transaction from USTT 165 (branch 309, block 313) and determines whether the next committed transaction's SCN is less than RSCN; if it is and T flag 169 in the transaction's USTTE 167 indicates that the transaction has modified a tracked table (321), the archiver takes branch 323; otherwise, it iterates loop 317. Having, found a transaction which has modified a tracked table, the Flashback archiver enters loop 331, which, continues until all of the undo blocks produced by the transaction have been read (decision block 325, branch 322). For each undo block produced by the transaction, the Flashback archiver reads field T 148 in the undo block (decision block 329); if it is set to indicate that the undo block contains a modification of a tracked table 131, the Flashback archiver take branch 333 and processes the modification. When all of the undo blocks produced by the transaction have been read, the Flashback archiver resets flag 169 in the USTTE 167 for the transaction (block 323) and iterates loop 317.

What the Flashback archiver does in branch 333 depends on whether the operation that performed the modification was a DML operation, i.e., one that modified the value of a field in a row of the tracked table, or a DDL operation, i.e., one that modified the form of the tracked table (decision block 335). In the first case, the archiver takes branch 337, makes a new HTE 137 for the row's prior version (block 341) from the undo for the row and the metadata in the TCRVTE 161 for the row's prior version and deletes the TCRVTE 161 for the prior version of the modified row (block 347). Next, the Archiver creates a new TCRVTE entry 161 for the metadata belonging to the modified row (block 334), and Having made the new HTE 137, the Flashback archiver resets tracked flag 148 in the undo block (block 349). In the second case, the archiver takes branch 335 and creates a new DDLHTE for the current form of the table (block 343). When the Flashback archiver has finished processing a block of undo, the Flashback archiver resets the block's tracked flag T 148 (block 349).

The new HTE's metadata is copied from the TCRV entry for the prior state of the modified row. SSCN 138 is the SCN for the row's prior state; ESCN 139 is the SCN 147 from the undo block; OP 141 indicates the operation which produced the prior state of the row; the rest of the row contains a copy of the user data 142 in the prior state of the row.

Continuing with branch 339 and block 343, DDL history table 153's entries DDLHTE 154 contain only metadata describing each form the tracked table 131 has had since it has been tracked. In the new DDLHTE 154, the SSCN field is set to the commit SCN of the transaction making the change, CN field 155, TY field 157, and HCN field 159 are set as required by the DDL transaction, and the ESCN field is set to null. The ESCN field of the preceding DDLHTE is set to the value of the SSCN in the new entry. In a preferred embodiment, the only changes in the form of tracked table 131 which are tracked in history table 153 are adding columns to tracked table 131 and dropping columns from tracked table 131; the technique just described could of course be used with any other DDL operation.

When the Flashback archiver has processed all of the committed transactions (decision block 305), it sets the instance's BSCN to RSCN (338) and sleeps until the next time to run comes (341).

In a presently preferred embodiment, the processing shown in flowchart 301 and just described may be done by the foreground process as well as the Flashback archiver. This occurs in situation in which the Flashback archiver falls behind in processing undo blocks. The foreground process keeps track of how many transactions have their tracked flags 69 set, and when that number increases beyond a threshold, the foreground process begins processing undo blocks and continues until the number of marked transactions drops below a second threshold.

Figure 4:
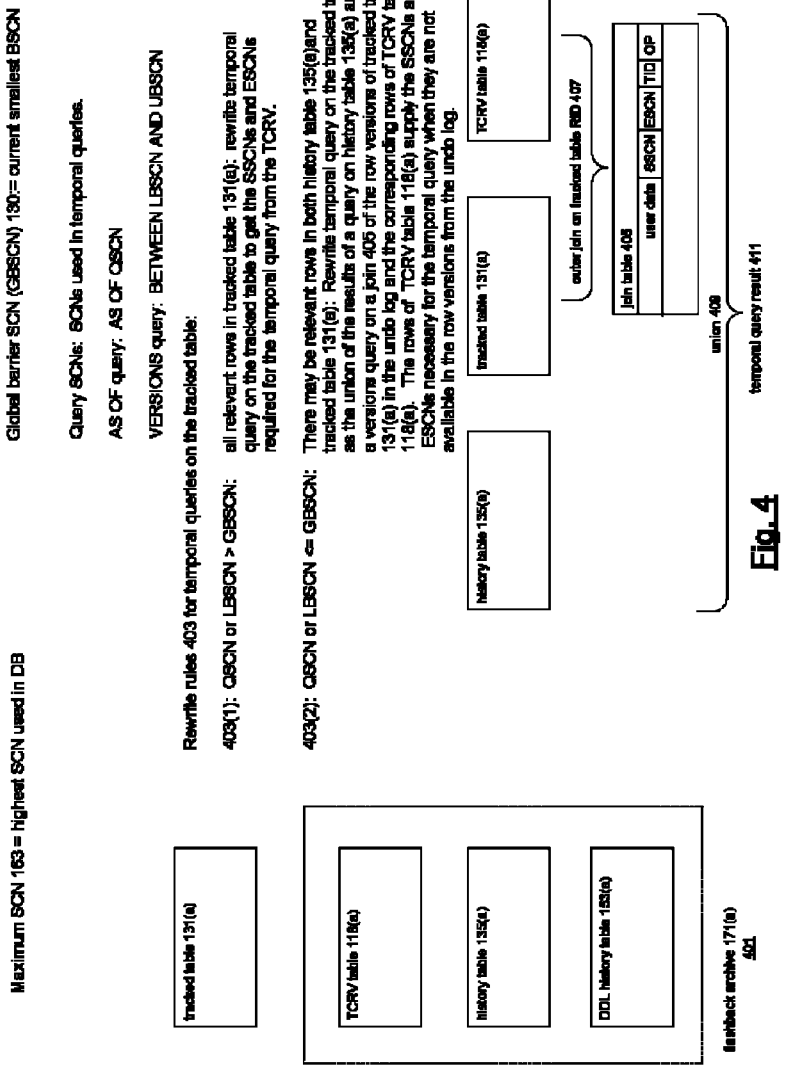
FIG. 4 is a diagram of how Flashback temporal queries on a tracked table are rewritten.

Performing Temporal Queries on a Tracked Table: FIGS. 4 and 5

In General

When a temporal query is performed on a tracked table 131(*i*), DBMS 101 rewrites the query to use the information in the table 131(*i*)'s Flashback archive 171(*i*). The rewriting is done at the semantic analysis-optimizer phase of query generation. There are two kinds of rewrites 403 in a preferred embodiment. Which is done is determined by the values of the SCNs used in the temporal queries. In an AS OF query, there is only one such SCN, which is termed the QSCN in FIG. 4. In a VERSIONS query, there are two, an LBSCN which indicates the lower bound for the SCNs for which versions are sought, and an UBSCN which indicates the upper bound for the SCNs for which versions are sought. The rewrite rules are:

403(1): when QSCN or LBSCN >GBSCN, all of the relevant rows are in tracked table 131(*a*); the temporal query is a limited Flahback versions query on the undo data for tracked table 131(*a*).

403(2): when QSCN or LBSCN>GBSCN, There may be relevant rows in both history table 135(*a*) and tracked table 131(*a*): Rewrite temporal query on the tracked table as the union of the results of a query on history table 135(*a*) and a join 405 of the row versions returned by a limited Flashback versions query on the tracked table 131(*a*) and the corresponding rows of TCRV table 118(*a*) for the returned row versions. The rows of TCRV table 118(*a*) supply the SSCNs and ESCNs necessary for the temporal query when they are not available in the row versions from the undo log.

As shown in FIG. 5, the rewrites must also take into account whether tracked table 131(*i*) has changed form between the lower SCN of the range of SCNs specified in the query and the upper SCN of the specified range of SCNs. The rewrite uses DDL history table 153(*i*) to determine what columns are required for the set of rows to be returned by the query, and all of those columns are returned in the result. Continuing in more detail with FIG. 5, the tracked table 503 in the example of FIG. 5 had four columns ABCD between SCN 03333 and SCN 15666; at that point, column E was added, as shown at 503(2); at SCN 27233, columns D and E were dropped, leaving the tracked table with the columns ABC, as shown at 503(3).

The DDLHTEs 154 for the relevant portion of DDLHT 131(*i*) are shown at 505. Starting at the bottom, there is a row with an SSCN of 03333 and an ESCN of 27322 for row D, which was in table 503(1) but was dropped at SCN 27322. The rows for columns A, B, and C have the same SSCN as row D, but since they are still in the table, their ESCN is null. The row for the addition of column E at SCN 15666 has an SSCN with that value and an ESCN of 27322, which is when the row was dropped. The top two rows are for the drop of columns D and E; since that is the current form of the table, these rows have SSCN=27322, which is the SCN for when the drop of rows D and E occurred and null ESCNs.

The results of various temporal queries on table 503 are shown at 507. The fundamental rule is that the columns of the result query will be selected from the union of all columns in the forms of the tracked table that existed during the range of SCNs specified in the query. The columns may come from the tracked table or from the tracked table's history table. In the AS OF queries, there is a single QSCN; in the VERSIONS query, there is a range of SCNs defined by LBSCN, the query lower bound SCN and UBSCN, the query upper bound SCN. The first AS OF query has a QSCN of 05000, which is within the range of SCNs during which version 503(1) of the table existed, so the result table for the AS OF query includes columns ABCD; the second AS OF query has a QSCN of 30000, which is within the range of SCNs during which current version of 503(3) has existed, so the result table includes only columns ABC. The first VERSIONS query has a LBSCN of 05000 and a UBSCN of 07000; these SCNs are within the range of SCNs during which version 503(1) existed, so the result table has columns ABCD; the second VERSIONS query has a LBSCN of 05000 and a UBSCN of 27000; these SCNs are within the range of SCNs during which version 503(1) and 503(2) existed, so the result table has columns ABCDE; the third VERSIONS query has a LBSCN of 05000 and a UBSCN of 30000; these SCNs are within the range of SCNs during which version 503(1), 503 (2), and 503(3) existed, so the result table has columns ABCDE.

Example Query Rewrite

FIG. 6 shows at 601 how DBMS 101 rewrites a temporal query on a tracked table 131(*j*) called GREATMOUNTAINEERS (611). At the time of the query, the global barrier SCN has the value 343520, as shown at 603. The example query is an AS OF query, and a current version of a row in GREATMOUNTAINEERS which was made on or before the time specified by the QSCN in the query will therefore satisfy the query. Consequently, the query must cover both history table 135(*j*) and GREATMOUNTAINEERS and the SSCNs and ESCNs for rows in the current version of GREATMOUNTAINEERS must come from the undo log and when they are unavailable there from TCRV table 118(*j*). The query as rewritten is the union 608 of the results of a query 607 and a query 609. Query 607 is on history table 135(*j*), which appears in the query as SCOTT.SYS_FBA_HIST__53127, and the ranges specified for STARTSCN and ENDSCN are such that the rows selected by the query will be contained in history table 135(*j*).

Query 609 replaces "GREATMOUNTAINEERS as of SCN 335672" from query 605 with an inline view that begins with "(Select t.ID" and ends with "NULL))))))". The inline view contains limited Flashback versions query on current version of GREATMOUNTAINEERS 611 joined with a query that provides the corresponding rows for the versions from TCRV table 118 (615). The TCRV rows contain any temporal metadata for the rows of the current version of GREATMOUNTAINEERS 611 that is not available from the undo data, and consequently, the temporal query can be run on the inline view to find current versions of rows in GREATMOUNTAINEERS that satisfy the AS OF temporal query. The rows returned by the rewritten query is the union of the rows of history table 135(*j*) returned by query 607 with the rows of tracked table 131(*j*) returned by query 609.

Indexes on the Tables in the Flashback Archive

Since historical information can grow to be very large compared to the current information, there have to be efficient ways of indexing the historical information so that Flashback queries well into the past perform well. Here are some of the indexes which could be used and their applications.

Indexes on the primary key are needed for doing as of queries for a given unique key or versions queries for a given unique key. These work well for small ranges of keys when the number of versions is also small. They can also be used when the historical data is moderately sized (<1 million rows).

Concatenated Indexes on start SCN and end SCN (descending) also work well for "as of" and versions queries over moderately sized data.

For large sized data and two dimensional range queries, more complicated indexing schemes are needed. Oracle provides some domain indexes which can be used for this purpose:

The Oracle time index [XTI] is a domain index for doing queries for a historical table, in which each row has a start and end time. This index will be useful for 1-dimensional range queries on transaction time. This index will be useful for answering "as of" or versions queries without a where clause. These indexes have obtained results superior to B-trees for tables of size more than a million.

The spatial index[SPAT] is another domain index which is primarily used to index objects in two or more dimensions. One can model a row as a line segment and model Flashback queries as intersection problems quite easily. For this application, superior results have been obtained for large tables for two dimensional range queries. The results for other queries are comparable with a B-tree index. A row with a primary key id, a start SCN sscn, and an end SCN escn can be modeled as a line ((id, sscn),(id,escn)). A query which asks for row versions id between 1,000,000 and 1,050,000, sscn <=498859, and escn>498759 can be modeled as the intersection with the rectangle with the two corners as ((1000000, 498759+0.1), (1050000, 498859)). (The +0.1 models the >relationship for SCNs)

A preferred embodiment may provide users with B-tree indexes and with spatial indexes for large data sets.

Figure 7:
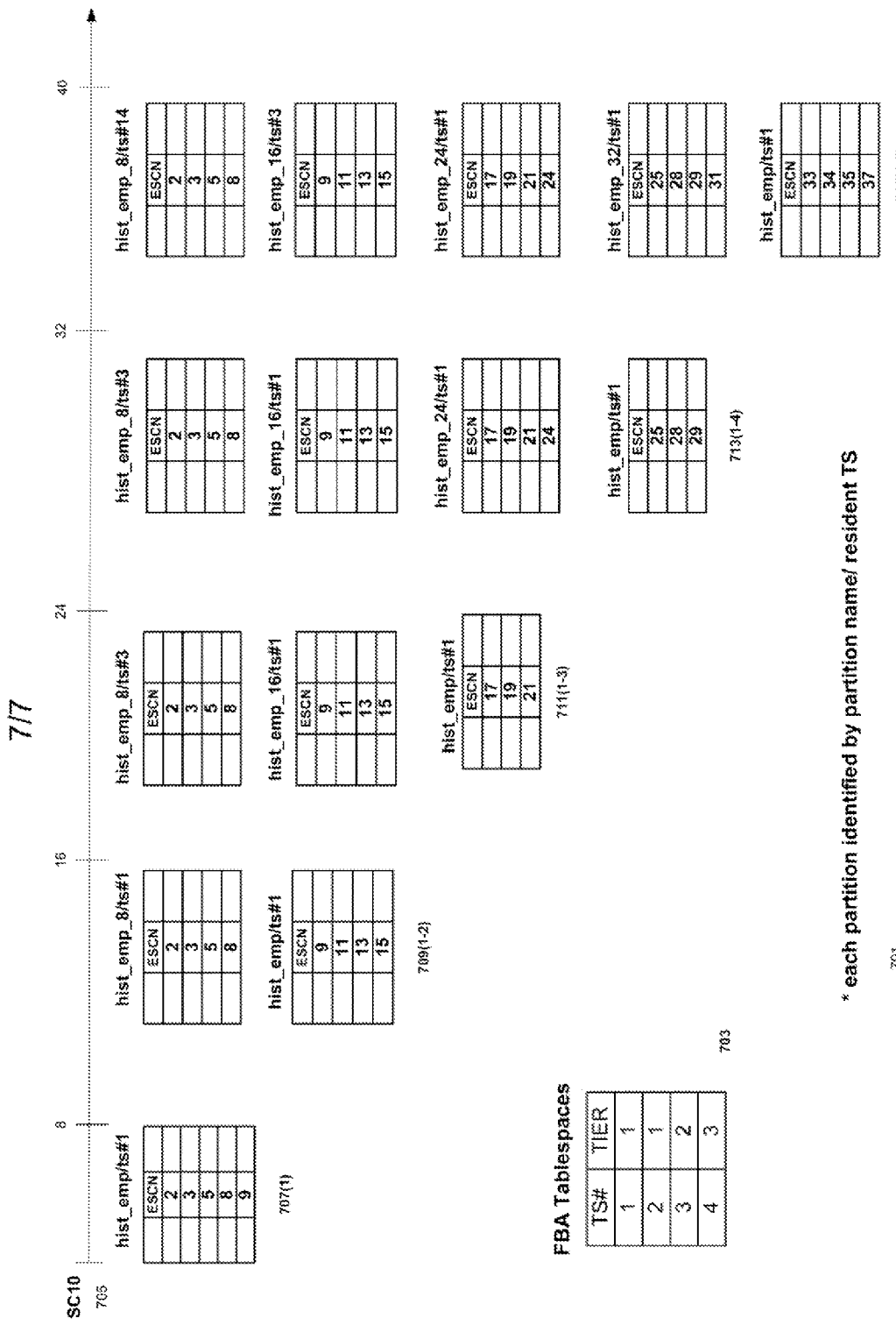
FIG. 7 shows how the history table is automatically repartitioned and how the older partitions are assigned to lower-cost storage tiers.

Dealing with the Storage Requirements of History Tables: FIG. 7

A history table 135 for a tracked table 131 will generally soon grow larger than tracked table 131; moreover, the period of time that a history table covers may be very long indeed. History tables 135 may thus be among the largest tables in the relational database system. Relational database systems manufactured by Oracle Corporation have a number of features which reduce the cost in both storage and access time of such very large tables. First, the administrator of an Oracle database system may partition a table in an Oracle relational database system into a number of smaller units. The partitions are invisible to user queries, but the program 109 which executes the queries determines which partitions are needed to run the query. The query is run on those partitions in parallel and only on those partitions. In the case of a history table 135, the table is partitioned on the ESCNs of the HTEs 137, i.e., the partitions contain history table entries belonging to non-overlapping ranges of ESCN values. Second, the administrator may assign the partitions to different storage tiers in the relational database system. Each storage tier has a different kind of persistent storage with different cost-per-bit and access speed tradeoffs. Typically, partitions with frequently-accessed data are kept in storage tiers with high-cost, high access speed persistent storage; as the data in a partition is less frequently accessed, the database manager moves the partition to cheaper and slower access tiers.

FIG. 7 shows at 701 how the Flashback archiver automatically repartitions the history table by ESCN values and moves the older partitions to cheaper and slower access tiers. As shown at 703, in example 701, the Flashback archiver is using four table spaces (TS#(1-4) to store partitions of the history table. The data for the tables in TS#1 and TS#2 is stored in relatively fast and expensive Tier 1 storage; the data for the tables in TS#3 is stored in slower and cheaper Tier 2 storage; the data for the tables in TS#4, finally, is stored in still slower and cheaper Tier 3 storage.

At 705 is shown a time line in which the times are expressed as increasing SCNs. The tracking which produces the example's hist_emp table (a history table for a tracked table of employees) begins at SCN 0. At that point, the Flashback archiver places hist_emp in a single partition 707(1) in TS#1. At ESCN 8, hist_emp has reached the maximum size possible in partition 707(1) and the archiver splits partition 707(1) into two partitions, 709(1 and 2). Partition 709(1) contains the rows of partition 707(1) and partition 709(2) receives the new rows that the archiver is adding to hist_emp. The process is repeated at 711, with 711(3) receiving the new rows. After splitting partition 709(2) to make 711(2 and 3), the archiver moves partition 711(1) into TS#3, which is in tier 2 storage. The process is again repeated at 713 and 715. At 715, the archiver moves partition 715(1) into TS#4 which is in tier 3 storage and moves partition 715(2) into TS#3.

Client Interfaces for Unlimited Flashback

The client interfaces for unlimited Flashback include DDL for creating, modifying, and dropping a Flashback archive as well as for enabling and disabling tracking and views that contain information about Flashback archives. Use of the interfaces and the views is governed by two privileges: the Flashback Archive privilege and the Flashback Archive Administer privilege:

1. Flashback Archive privilege: This is an object privilege that has to be granted on particular Flashback Archives for users to enable tracking/s archive on tables. This privilege can be granted and revoked as follows:
   grant flashback archive on ftest1 to scott;
   revoke flashback archive on ftest1 from scott;

2. Flashback Archive Administer privilege: This is a system privilege and is required to be able to perform any of the following operations:
   Create Flashback archive (default or other)
   Drop flashback archive
   Alter Flashback archive to
      a) Add tablespace to a Flashback archive: In addition check for ownership of tablespace and required quota on tablespace for this owner.
      b) Modify tablespace quota that is added to a flashback archive: In addition check for ownership of tablespace and required quota on tablespace for this owner.
      c) Remove tablespace from a flashback archive: In addition check for ownership of tablespace.
      d) Modify retention of a Flashback Archive
      e) Make a flashback archive as a default Flashback Archive
      f) Purge all history from a flashback archive
      g) Purge all history before the SCN specified from a flashback archive
      h) Purge all history before the time specified from a flashback archive
      i) Disable flashback archive on a flashback archive enabled table
   This privilege can be granted and revoked as follows:
   grant flashback archive administer to scott;
   revoke flashback archive administer from scott;

The default flashback archive is used for storing certain system and history specific metadata information. It is also used to store history for tracked tables when the user has not specified a flashback archive for that table. Users should have alter and DML privileges or be the owners of a table that that they wish to make a tracked table. Flashback privilege is necessary to access the history table as is required to perform any temporal query on the tracked table.

Creating, Modifying, and Dropping Flashback Archives

A flashback archive is created with the create flashback archive command. With this command, a flashback archive with given name and retention duration is created. The first tablespace of the flashback archive along with the maximum amount of space from this tablespace, which can be used, by this flashback archive is also specified. Also, this new flashback archive can optionally be made the default flashback archive for the system. The syntax of this command is as follows:

```
Create_flashback_archive_command::=
  CREATE FLASHBACK ARCHIVE [DEFAULT]
  <flashback_archive_name>
  TABLESPACE <tablespace_name> [QUOTA space_expr]
  RETENTION <time_expr>;
  time_expr ::= <number> {YEAR|MONTH|DAY}
  space_expr ::= <number> {M|G|T|P}
```

Examples:
a. CREATE FLASHBACK ARCHIVE DEFAULT fla1 TABLESPACE tbs1 QUOTA 10G RETENTION 1 YEAR;
   This creates a flashback archive called fla1. fla1 will be the default flashback archive for the system. fla1 uses up to 10 GB of space from tablespace tbs1. History of tables archived in fla1 will be stored for up to a year.
b. CREATE FLASHBACK ARCHIVE fla2 TABLESPACE tbs2 RETENTION 2 YEAR;
   This creates a flashback archive called fla2, which uses tablespace tbs2 and stores history for tables archived in it for two years.

The attributes of a flashback archive can be modified using the alter flashback archive command. This command can be used to add/modify/remove tablespaces in the flashback archive as well as modify the retention duration, make default flashback archive and purge history. If tablespaces are removed, at least one tablespace should remain in the flashback archive, otherwise an error will be issued.

```
alter_flashback_archive_command::=
ALTER FLASHBACK ARCHIVE <flashback_archive_name>
{ADD TABLESPACE <tablespace_name> [QUOTA space_expr]
 | MODIFY TABLESPACE <tablespace_name> [QUOTA space_expr]
 | MODIFY RETENTION <time_expr>
 | REMOVE TABLESPACE <tablespace_name>
 | PURGE [ALL | BEFORE { SCN <expr> | TIMESTAMP <expr>}]
 | set default
};
```

Examples:
a. ALTER FLASHBACK ARCHIVE fla1 ADD TABLESPACE tbs3 QUOTA 5G;
   This adds up to 5 GB of space from tablespace tbs3.
b. ALTER FLASHBACK ARCHIVE fla1 ADD TABLESPACE tbs4;
   This adds as much of tablespace tbs4 as needed to flashback archive fla1.
c. ALTER FLASHBACK ARCHIVE fla1 MODIFY TABLESPACE tbs3 QUOTA 20G;
d. This command modifies flashback archive fla1 so that the quota on tbs3 is 20 GB. ALTER FLASHBACK ARCHIVE fla1 MODIFY TABLESPACE tbs1;
   This command modifies flashback archive fla1 so that there is no quota on tbs1.
e. ALTER FLASHBACK ARCHIVE fla1 MODIFY RETENTION 2 YEAR;
   This command modifies the retention duration for all tables stored in flashback archive fla1 to be 2 years.
f. ALTER FLASHBACK ARCHIVE fla1 REMOVE TABLESPACE tbs2;
   This command removes tablespace tbs2 from flashback archive fla1, provided that there remains at least one tablespace in fla1. If not, tablespace tbs2 will not be dropped.
g. ALTER FLASHBACK ARCHIVE fla1 PURGE ALL;
   This command removes all of the historical data in the flashback archive fla1.
h. ALTER FLASHBACK ARCHIVE fla1 PURGE BEFORE TIMESTAMP (SYSTIMESTAMP—INTERVAL '1' day);
   This command removes all historical information in the flashback archive older than a day.
i. ALTER FLASHBACK ARCHIVE fla1 PURGE BEFORE SCN 728969;
   This command removes all historical information in the flashback archive older than SCN 728969.
j. ALTER FLASHBACK ARCHIVE fla1 SET DEFAULT;
   Flashback archive fla1 is now the default flashback archive for the system and will be used when a table is marked for tracking without specifying a flashback archive.

The drop flashback archive command is used to remove a flashback archive. All the historical information stored in it will be deleted. However, the tablespaces in it will not be dropped.

The syntax of the drop flashback command is as follows:

```
drop_flashback_archive_command::=
  DROP FLASHBACK ARCHIVE <flashback_archive_name>;
```

Example:
Drop Flashback Archive fla1;
This removes flashback archive fla1 including all of the historical information stored in it. The tablespaces in fla1 will not be dropped.

Enabling and Disabling a Tracked Table 131

Enabling a table for tracking and disabling it from being tracked is done by adding a flashback archive clause to the ALTER TABLE DDL command. or in the case of a new table to the CREATE TABLE DDL command. The flashback archive clause looks like this:

```
flashback_archive_clause::=
  {FLASHBACK ARCHIVE [<archive_store_name>]
   | NO FLASHBACK ARCHIVE}
```

This command enables or disables tracking of the history for a given table. By default, tracking will be disabled. When "FLASHBACK ARCHIVE" is specified tracking on the entire table will be performed. If "NO FLASHBACK ARCHIVE" is used tracking is disabled on the table. If the specified flashback archive does not exist then an error is issued. DBMS 101 responds to tracking being enabled by setting TT flag 129 in the tracked table's entry 128 in the data dictionary and initializing DDL history table 153. In the case of DDL history table 153, this is done by writing a row for each column of the tracked table to DDL history table 153. When tracking is disabled for a tracked table 131(i), all tables in the tracked table's Flashback archive 171(i) are dropped.

If the table was already a tracked table and a different flashback archive is specified then an error will be issued.
Examples:
a. ALTER TABLE EMP FLASHBACK ARCHIVE;
   We enable history tracking on the table EMP and archive it in the default flashback archive.
b. ALTER TABLE EMP FLASHBACK ARCHIVE fla1;
   This enables history tracking on the table EMP and archive the historical data in the flashback archives fla1 provided fla1 exists and EMP was not previously tracked.
c. ALTER TABLE EMP NO FLASHBACK ARCHIVE;
   This stops history tracking for table EMP.
   Views for Accessing Properties of Flashback Archives
   The following views are provided:
   The view DBA_FLASHBACK_ARCHIVE contains information about the flashback archives available in the system. Accessing this view requires a Flashback Archive Administer or DBA privilege. The view has the following columns:

```
FLASHBACK_ARCHIVE_NAME string
FLASHBACK_ARCHIVE# string
RETENTION_IN_DAYS number
CREATE_TIME timestamp
LAST_PURGE_TIME timestamp
STATUS string
``` comment on column DBA_FLASHBACK_ARCHIVE.FLASHBACK_ARCHIVE_NAME is 'Name of the flashback archive'
comment on column DBA_FLASHBACK_ARCHIVE.FLASHBACK_ARCHIVE# is 'Number of the flashback archive'
comment on column DBA_FLASHBACK_ARCHIVE.RETENTION_IN_DAYS is 'Maximum duration in days for which data is retained in the flashback archive'
comment on column DBA_FLASHBACK_ARCHIVE.CREATE_TIME is 'Time at which the flashback archive was created'
comment on column DBA_FLASHBACK_ARCHIVE.LAST_PURGE_TIME is 'Time at which the data in the flashback archive was last purged by the system'
comment on column DBA_FLASHBACK_ARCHIVE.STATUS is 'Indicates whether the flashback archive is a default flashback archive for the system'

The view USER_FLASHBACK_ARCHIVE contains information about the flashback archives that the user has access to. A user is shown only those flashback archives for which Flashback Archive Object privilege has been granted to the user accessing the view. This view can also be accessed by SYSDBA or users with Flashback Archive Administer privilege.
It has the following columns:

```
FLASHBACK_ARCHIVE_NAME string
FLASHBACK_ARCHIVE# string
RETENTION_IN_DAYS number
CREATE_TIME timestamp
LAST_PURGE_TIME timestamp
STATUS string
``` comment on column USER_FLASHBACK_ARCHIVE.FLASHBACK_ARCHIVE_NAME is 'Name of the flashback archive'
comment on column USER_FLASHBACK_ARCHIVE.FLASHBACK_ARCHIVE# is 'Number of the flashback archive'
comment on column USER_FLASHBACK_ARCHIVE.RETENTION_IN_DAYS is 'Maximum duration in days for which data is retained in the flashback archive'
comment on column USER_FLASHBACK_ARCHIVE.CREATE_TIME is 'Time at which the flashback archive was created'
comment on column USER_FLASHBACK_ARCHIVE.LAST_PURGE_TIME is 'Time at which the data in the flashback archive was last purged by the system'
comment on column USER_FLASHBACK_ARCHIVE.STATUS is 'Indicates whether the flashback archive is a default flashback archive for the system'

The view DBA_FLASHBACK_ARCHIVE_TS contains information about the tablespaces in the flashback archives. This will give information, with respect to flashback archive names, numbers and the tablespaces with their quotas. Access to the view requires a Flashback Archive Administer or DBA privilege. It has the following columns:

```
FLASHBACK_ARCHIVE_NAME string
FLASHBACK_ARCHIVE# number
TABLESPACE_NAME string
QUOTA_IN_MB number
``` comment on column DBA_FLASHBACK_ARCHIVE_TS.FLASHBACK_ARCHIVE_NAME is 'Name of the flashback archive'
comment on column DBA_FLASHBACK_ARCHIVE TS.FLASHBACK_ARCHIVE# is 'Number of the flashback archive'
comment on column DBA_FLASHBACK_ARCHIVE_TS.TABLESPACE_NAME is 'Name of a tablespace in the flashback archive'
comment on column DBA_FLASHBACK_ARCHIVE_TS.QUOTA_IN_MB is 'Maximum space in MB that can be used for Flashback Archive from the tablespace. NULL indicates no Quota restriction.

The view DBA_FLASHBACK_ARCHIVE_TABLES contains information about all the tables that are enabled for Flashback Archive. Access to the view requires a Flashback Archive Administer or DBA privilege. It has the following columns:

```
TABLE_NAME string
OWNER_NAME string
FLASHBACK_ARCHIVE_NAME string
ARCHIVE_TABLE_NAME string
``` comment on column DBA_FLASHBACK_ARCHIVE_TABLES.TABLE_NAME is 'Name of the table enabled for Flashback Archive'
comment on column DBA_FLASHBACK_ARCHIVE_TABLES.OWNER_NAME is 'Owner name of the table enabled for Flashback Archive'
comment on column DBA_FLASHBACK_ARCHIVE_TABLES.FLASHBACK_ARCHIVE_NAME is 'Name of the flashback archive'
comment on column DBA_FLASHBACK_ARCHIVE_TABLES.ARCHIVE_TABLE_NAME is 'Name of the archive table containing the historical data for the user table'

The view USER_FLASHBACK_ARCHIVED_TABLES contains information about a user's tables that are enabled for Flashback Archive. A user is shown only those entries for which he has both alter privilege (or owner) on table and Flashback Archive Object privilege on the flashback archive on which the table has been archived. This view can also be accessed by SYSDBA or users with Flashback Archive Administer privilege. It has the following columns:

```
TABLE_NAME string
OWNER_NAME string
FLASHBACK_ARCHIVE_NAME string
ARCHIVE_TABLE_NAME string
``` comment on table USER_FLASHBACK_ARCHIVE TABLES is 'Information about the user tables that are enabled for Flashback Archive' comment on column USER_FLASHBACK_ARCHIVE_TABLES.TABLE_NAME is 'Name of the table enabled for Flashback Archive' comment on column USER_FLASHBACK_ARCHIVE_TABLES.OWNER_NAME is 'Owner name of the table enabled for Flashback Archive' comment on column USER_FLASHBACK_ARCHIVE_TABLES.FLASHBACK_ARCHIVE_NAME is 'Name of the flashback archive' comment on column USER_FLASHBACK_ARCHIVE_TABLES.ARCHIVE_TABLE_NAME is 'Name of the archive table containing the historical data for the user table'

CONCLUSION

The foregoing Detailed Description has set forth to those skilled in the relevant technologies how to track row versions in a table by associating a Flashback archive with the tracked table, writing versions which are no longer in the tracked table and the temporal metadata for the versions to a history table in the archive and how to use the history table in a temporal query on the tracked table. The Detailed Description has further disclosed the best method presently known to the inventors of making and using Flashback archives. As disclosed, temporal queries using the Flashback archive take advantage of limited Flashback temporal queries on the tracked table which obtain versions of the tracked table's records which are not in the history table and their temporal metadata from the undo log. The Flashback archive thus makes it possible to execute temporal queries which will return versions of rows that are no longer in the undo log. A DDL history table in the archive further makes it possible to track rows across changes in the tracked table's form. In a preferred embodiment, the history table and DDL history table are constructed by a background process. The use of the temporal query on the undo log to obtain the versions of the tracked table's rows that are not yet in the history table and the use of system process to construct the history table makes it unnecessary to modify the tracked table's form in order to perform temporal queries on it. The use of a background archiving process to construct the history table, finally, keeps archive maintenance from interfering with query execution.

As will be apparent to those skilled in the relevant technologies, many embodiments of the invention other than the ones disclosed herein are possible. For example, triggers or the foreground process may be used to construct the history table. Further, the TCRV table may be used to obtain temporal metadata for all of the current rows of the tracked table. The use of the undo log in the preferred embodiment is to some extent an artifact of the prior existence of limited Flashback query; in other embodiments, other techniques for performing temporal queries on the current rows of the tracked table may be employed. Further, in other embodiments the temporal metadata may be expressed using time stamps instead of SCNs and may express a period of time in other ways than as an SSCN and an ESCN. Moreover, the additional information associated with a row version may be different from the additional information associated with the row version in the preferred embodiment.

Many of the characteristics of the preferred embodiment are of course determined by the relational database system in which the preferred embodiment is implemented. One such example is the existence of undo and its use; another is the technique used to compute GBSCN; another is the need to maintain a table that relates SCNs to time values; still another is the distribution of the history table across a set of partitions that belong to different storage tiers.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. A method performed in a database management system for enabling a temporal query on a user set of objects, the user set of objects having been designated in the database management system as a set of tracked objects,
the method comprising:
  when a current version of an object in the user set of objects is replaced by another version of the object,
    including temporal metadata for the other version in an undo log which is associated with the tracked set of objects but separate therefrom; and
    altering the undo log as required by the replacement; and
  writing a historical version for the current version of the object that has been replaced in a set of historical versions using temporal metadata stored in the undo log, the set of historical versions being associated with but separate from the set of tracked objects; and
  wherein the temporal query takes into account the temporal metadata in the undo log, the tracked set of objects and the historical versions in the set of historical versions.

2. The method set forth in claim 1 wherein:
  designation of the user set of objects as the set of tracked objects is a database system operation;
  the undo log and the set of historical versions are system sets that are created and maintained by the database system; and
  the steps of the method are automatically performed by the database system.

3. The method set forth in claim 2 further comprising the step of:
  generating an index for the set of historical versions.

4. The method set forth in claim 2 wherein
  the database management system implements the set of historical versions using partitions that are stored in storage tiers having a range of storage costs and access times; and
  the method includes the steps of:
  adding a new partition to the set of historical versions for new versions therein and moving an existing partition to a storage tier having lower cost and slower access time.

5. The method set forth in claim 2 wherein:
the temporal metadata includes values generated by the database system.

6. The method set forth in claim 5 wherein:
the temporal metadata used in the temporal queries is monotonically increasing system change numbers generated by the database system, the system change number indicating a temporal order for the modification of the object in the set of tracked objects.

7. The method set forth in claim 6 wherein:
the historical version for the current version of the object being replaced in the set of historical versions includes the system change number for the replaced version of the tracked object and the system change number for other version of the object.

8. The method set forth in claim 6 wherein:
an object in the set of tracked of objects is modified by a transaction performed by the database management system and
the temporal metadata in the undo log corresponding to an object in the set of tracked objects includes the system change number, a transaction identifier for the transaction that modified the corresponding object in the set of tracked objects, a row identifier for the corresponding object in set of tracked objects, and an identifier for the operation by which the corresponding object in the set of tracked objects was modified.

9. The method set forth in claim 2 wherein
the database system maintains the undo log; and
the method further comprises the step of:
determining from the undo log when an operation on an object in the tracked set of objects has produced an altered version of the object.

10. The method set forth in claim 9 wherein the undo log is written by a foreground process of the database management system; and
the remaining steps of the method are performed by a background process of the database management system.

11. The method set forth in claim 10 wherein:
when the foreground process determines that the background process is not responding fast enough when the operation has produced the altered version of the object, the remaining steps of the method are also performed by the foreground process.

12. The method set forth in claim 10 wherein:
a most recent portion of the undo log is contained in a buffer in memory in the database management system; and
the background process is scheduled such that the background process performs the remaining steps using the most recent portion of the undo log contained in the buffer.

13. The method set forth in claim 1 wherein
the set of tracked objects is further associated with but separate from a set of historical form descriptions for the set of tracked objects, at least one of the historical form descriptions further being associated with temporal metadata indicating when the set of tracked objects had a particular form and
the method further comprises:
adding a historical form description to the set of historical forms that describes a new form, the associated temporal metadata indicating at least when the change to the new form occurred.

14. The method set forth in claim 1 wherein:
designation of the user set of objects as the set of tracked objects requires no modification of the form and/or behavior of the user set of objects.

15. An archive in a memory device accessible to a database management system for enabling a temporal query on objects belonging to a user set of objects which has been designated in the database management system as a tracked set of objects,
the archive comprising:
a system set of history objects corresponding to historical versions of objects in the tracked set of objects, the history objects including temporal metadata required for a temporal query on the set of history objects, the system set of history objects being associated with but separate from the tracked set of objects, wherein the temporal metadata required for the temporal query is not stored with the tracked set of objects, and wherein the system set of history objects is created based at least in part upon temporal metadata stored in an undo log associated with the tracked set of objects; and
a system set of form history objects corresponding to the tracked set of objects which describe versions of the form of the tracked set of objects and include temporal metadata indicating when the versions existed, the system set of form history objects being associated with but separate from the tracked set of objects and wherein the system set of history objects is created based at least in part upon temporal metadata stored in the undo log associated with the tracked set of objects;
the database management system maintaining the system set of history objects and the system set of form history objects for the tracked set of objects and employing the system set of form history objects to determine a form of query results returned from the system set of history objects; and
wherein the temporal query takes into account the temporal metadata in the undo log, the tracked set of objects, the system set of history objects, and the system set of form history objects.

16. The archive set forth in claim 15 further comprising:
a system set of current temporal metadata.

17. A system set of temporal metadata for enabling a temporal query on a user set of objects designated as a set of tracked objects in a memory device accessible to a database management system, the system set of temporal metadata being associated with but separate from the user set of objects, the system set of temporal metadata being automatically maintained by the database system in response to operations on the set of tracked objects, wherein
a member of the system set of temporal metadata corresponds to an object of the set of tracked objects which has been added or modified since designation of the set of tracked objects, the member of the system set of temporal metadata comprising temporal data to be associated with determining when the corresponding object of the set of tracked objects was added or modified;
wherein the system set of temporal metadata is created based at least in part upon temporal metadata stored in an undo log associated with the set of tracked objects; and
wherein the temporal query takes into account the temporal metadata in the undo log, the set of tracked objects, and the system set of temporal metadata.

18. The system set of temporal metadata set forth in claim 17 wherein:
the temporal metadata includes values generated by the database system.

19. A method for enabling a temporal query on a tracked object belonging to a user set of objects designated in a database management system as a set of tracked objects, performed in a database management system which automatically maintains records of prior versions of altered objects in an undo log for a first period of time and the method comprising:

determining, by using a processor, from the maintained records in the undo log whether the tracked object has been modified; and responding when the maintained records in the undo log so indicate by adding a former version of the tracked object to a set of former versions of the tracked object which are maintained for a second period of time which is independent of the first period of time, the former version of the tracked object being created based at least in part upon temporal metadata from the maintained records of the undo log indicating a period during which the former version of the tracked object was a current version thereof, wherein the temporal metadata required for a temporal query is not stored with the set of tracked objects; and wherein the temporal query takes into account the temporal metadata in the undo log, the set of tracked objects, and the set of former versions of the tracked object.

20. The method set forth in claim 19 further comprises:

adding a historical form description to a set of historical forms that describes a new form.

21. An index, embodied in a non-transitory computer-readable medium, wherein the index is associated with a set of former versions of objects in a set of tracked objects, the set of former versions including temporal metadata indicating a period during which a former version of the set of former versions had been a current version, the index being made in a database management system that includes a spatial index which indexes objects in a plurality of dimensions and the index comprising:

an identifier for the former version; and the former version's temporal metadata, wherein the temporal metadata required for temporal queries is not stored with the set of tracked objects and the temporal metadata is used to model an object as a line segment, whereby the temporal queries are solved using the index as intersection problems;

wherein the index is created based at least in part upon temporal metadata stored in an undo log associated with the set of tracked objects; and wherein a temporal query of the temporal queries takes into account the temporal metadata in the undo log, the set of tracked objects, the set of former versions of objects, and the index.

22. The index set forth in claim 21 wherein:

the temporal metadata includes values generated by the database management system.

* * * * *

UNITED STATES PATENT AND TRADEMARK OFFICE
CERTIFICATE OF CORRECTION

PATENT NO. : 8,589,357 B2
APPLICATION NO. : 11/863310
DATED : November 19, 2013
INVENTOR(S) : Radhakrishnan et al.

It is certified that error appears in the above-identified patent and that said Letters Patent is hereby corrected as shown below:

In the Specification

In column 2, line 40, delete "@" and insert -- ® --, therefor.

In column 3, line 21, delete "database," and insert -- database --, therefor.

In column 6, line 58, delete "tab/es" and insert -- tables --, therefor.

In column 8, line 30, delete "rows" and insert -- row's --, therefor.

In column 8, line 40, delete "the a" and insert -- a --, therefor.

In column 8, line 53, delete "temporal," and insert -- temporal --, therefor.

In column 10, line 48, delete "undo:" and insert -- undo --, therefor.

In column 10, line 56, delete "for'" and insert -- for --, therefor.

In column 11, line 46, delete "Tcrv" and insert -- TCRV --, therefor.

In column 12, line 5, delete "Having," and insert -- Having --, therefor.

In column 12, line 6, delete "which," and insert -- which --, therefor.

In column 13, line 20, delete "temperal" and insert -- temporal --, therefor.

In column 13, line 21, delete "Flahback" and insert -- Flashback --, therefor.

In column 13, line 23, delete "LBSCN>GBSCN," and insert -- LBSCN<=GBSCN, --, therefor.

In column 13, line 28, delete "on the" and insert -- on --, therefor.

In column 16, line 64, delete "that that" and insert -- that --, therefor.

Signed and Sealed this
Tenth Day of June, 2014

Michelle K. Lee
*Deputy Director of the United States Patent and Trademark Office*

CERTIFICATE OF CORRECTION (continued)
U.S. Pat. No. 8,589,357 B2

In column 19, line 9, delete "archives" and insert -- archive, --, therefor.

In the Claims

In column 22, line 38, in Claim 1, after "therefrom;" delete "and".

In column 22, line 44, in Claim 1, after "objects;" delete "and".

In column 23, line 18, in Claim 8, after "tracked" delete "of".

In column 25, line 22, in Claim 19, after "objects;" delete "and".

UNITED STATES PATENT AND TRADEMARK OFFICE
CERTIFICATE OF CORRECTION

PATENT NO.       : 8,589,357 B2
APPLICATION NO.  : 11/863310
DATED            : November 19, 2013
INVENTOR(S)      : Venkatesh Radhakrishnan et al.

It is certified that error appears in the above-identified patent and that said Letters Patent is hereby corrected as shown below:

In the Claims

Col. 25, Claim 19, Line 6, replace "and" with --,--
Col. 26, Claim 21, Line 8, replace "and" with --,--

Signed and Sealed this
Fourteenth Day of October, 2014

Michelle K. Lee
*Deputy Director of the United States Patent and Trademark Office*